United States Patent [19]

Schlesinger et al.

[11] Patent Number: 4,646,423

[45] Date of Patent: Mar. 3, 1987

[54] DEVICE FOR THE CHANGING OF DRILL HEADS OR SIMILAR

[75] Inventors: Hans-Joachim Schlesinger, Munich; Waldemar Offner, Unterhaching, both of Fed. Rep. of Germany

[73] Assignee: Grob-Werke GmbH & Co, K.G., Mindelheim, Fed. Rep. of Germany

[21] Appl. No.: 874,071

[22] Filed: Jun. 13, 1986

[30] Foreign Application Priority Data

Jun. 22, 1985 [DE] Fed. Rep. of Germany ....... 3522488

[51] Int. Cl.$^4$ ...................... B23Q 3/157; B23Q 41/02
[52] U.S. Cl. ...................................... 29/568; 29/33 P; 29/563
[58] Field of Search .............. 29/568, 33 P, 563, 26 A

[56] References Cited

U.S. PATENT DOCUMENTS

| 3,286,595 | 11/1966 | Wollenhaupt | 29/568 |
| 3,781,974 | 1/1974 | Holzl et al. | 29/568 |
| 4,035,904 | 7/1977 | Ishizaka et al. | 29/563 |
| 4,354,306 | 10/1982 | Ida et al. | 29/568 |
| 4,503,596 | 3/1985 | Ida et al. | 29/568 |

FOREIGN PATENT DOCUMENTS 2617608 11/1977 Fed. Rep. of Germany ........ 29/568

*Primary Examiner*—Z. R. Bilinsky
*Attorney, Agent, or Firm*—Holman & Stern

[57] ABSTRACT

The invention relates to a device for changing drill heads or other tool heads in machine tools arranged along a workpiece transfer line. Tool changing devices 5,6 are movable with respect to the transfer line 13 on tracks 3,4 which basically consist of a lifting mechanism 9, a turning mechanism 10 and gripping mechanisms 7,8. It is possible by means of this changing device to grip the boring heads 11,14, lift, turn and deposit these again. The same changing device can be used for a multiplicity of machine tools.

5 Claims, 2 Drawing Figures

DEVICE FOR THE CHANGING OF DRILL HEADS OR SIMILAR

BACKGROUND OF THE INVENTION

The invention relates to a device for the changing of drill heads or similar on workpiece transfer lines, whereby machine tools are arranged one after the other at the sides of the line in the direction of transfer.

The machine tools are situated on both sides of the path of transfer lines, for example boring machines, which are, as a rule, provided with feeding mechanisms, and permit horizontal feed at right angles to the direction of transfer. The boring machines have boring heads, which are arranged according to the appropriate boring pattern. If the type of workpiece changes, the boring heads must, of course, be changed.

Exchanging the boring heads is also neccessary if the tools have to be re-ground or replaced.

If change occurs only occasionally, it is possible to effect the changing of the boring heads by conventional means. In so doing, the boring heads are disassembled by hand and the new boring heads assembled. If, however, the type of workpiece is subject to frequent exchange, or if the series to be produced is relatively small, it is necessary to create an arrangement which accelerates the interchanging of boring heads. During the interchanging of the boring heads, there is an interruption in production, thus bringing the entire transfer line to a virtual standstill, which is to be avoided or confined to limited periods.

It is the practice to provide boring head carriers for the changing of boring heads, which carriers are pivotal about vertical axes, so that a plurality of boring heads can be arranged on the boring head carrier, which are further indexed around a turret arrangement. Machines of such construction are very expensive as a separate drive must be provided for each boring head. The space requirement for the machine is relatively large, particularly in the direction of the transfer line. The standby boring heads are not just aligned in direction of the work-pieces, but also at an angle to them. The movement of the turret requires a lot of space, which must be allowed for by providing an adequate distance from the next machine tool. As a result, the space requirement increases for the entire system. With this, there is the particular disadvantage that the processing speed is reduced, since the transportation times add to the machining times.

Problems of the afore-described nature do not just arise in connection with the interchanging of boring heads. The same problems arise also for other processing machines or even for equipments which check or monitor the work-piece by means of a gauge or template.

SUMMARY OF THE INVENTION

It is the object of the invention to produce an improved device of the type mentioned in the preamble to such an extent that even a relatively frequent change of boring heads or similar is possible, whereby interruptions to production are reduced to a minimal period and, in particular, the distance of individual machine tools from each other can be kept to a minimum.

To resolve this task, the invention proceeds on the basis of the device of the type described in the preamble and proposes that vertically to the direction of transfer over the machine tools is provided a track for a changing device associated with a plurality of machine tools, which basically consists of a gripping mechanism, a lifting mechanism and a turning mechanism, whereby the changing device grips the boring head or similar of a machine tool, lifts it over the upper edge of the machine tool and turns it about a vertical axis, in order to bring the boring head or similar to a waiting position in the region of the end of this machine tool opposite the transfer line and to position it there. The changing device which the invention proposes is, indeed, relatively expensive, since it must include a multiple of functions, but the changing device can, however, be used for all the machine tools of this transfer line on account of the track extending along the transfer line. The invention requires, in particular, a very minimal space requirement. Since the turning operation is carried out above the machine tools, the space requirement for the changing device does not determine the distance of the individual processing machines from each other.

A considerable advantage of the proposal of the invention accrues from the fact that the boring head or similar which is situated in the waiting position, can be interchanged by a selected number of boring heads, by simple conventional means, and during this period of exchange the next change can consequently be prepared without interrupting production.

As a result, the construction of the machine tool in question remains relatively simple. Coupling devices are only to be provided for one of the boring heads or similar, which is situated in the machining position. The changing mechanism, the turning mechanism or similar means are integrated in the changing device.

It is especially advantageous if the changing device has two gripping mechanisms, which are arranged opposite the vertical axis, in order to place a second boring head or similar in the machining position of the machine tool during the turning step.

The track is advantageously arranged laterally to the centre plane of the transfer line and the vertical axis is arranged on the outer side of the track. This provides a favourable, space saving arrangement, and permits also a track and a changing device in each case on both sides of the centre plane of the transfer line, so that a changing device is always associated with a row of machine tools on one side of the transfer line. The changing device, in a proven construction, consists of a travelling carriage on a track to which is attached laterally the lifting mechanism with the turning mechanism around the vertical axis, whereby the turning mechanism features in the bottom region a carrier or pivot arm held in the centre, which has a gripping device on each of its two ends.

BRIEF DESCRIPTION OF DRAWINGS

An embodiment of the invention is schematically illustrated in the drawings which show.

DETAILED DESCRIPTION OF AN EMBODIMENT

Figure 1:
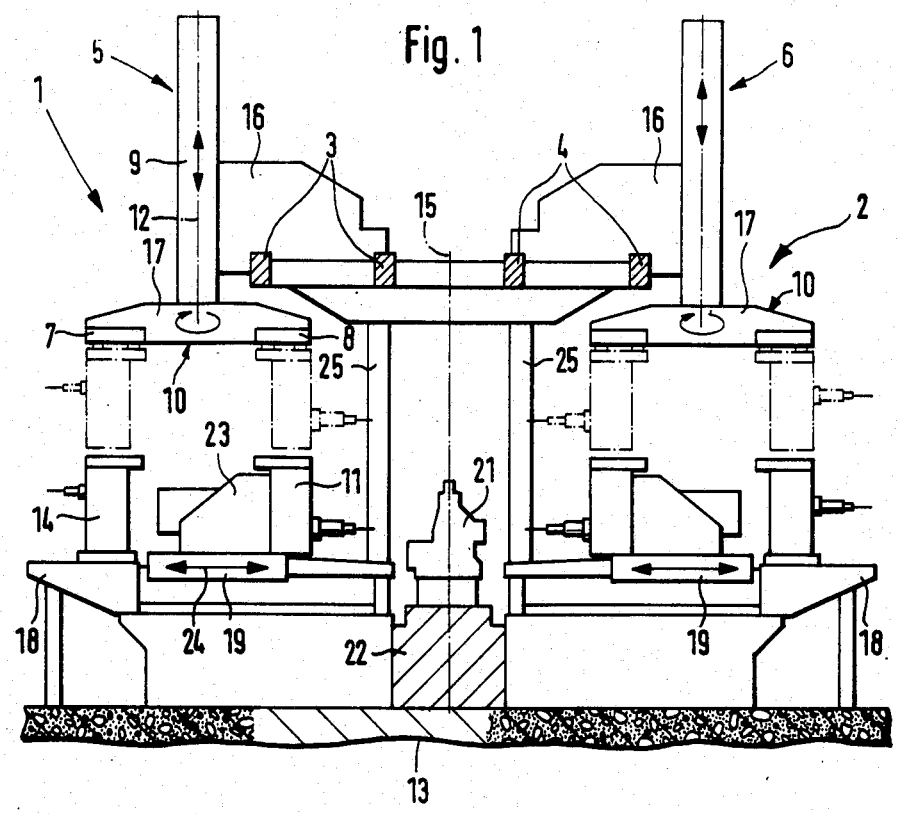
FIG. 1, a cross section through a transfer line having devices in accordance with the invention.

Workpieces 21 are transported vertically to the plane of the paper from machining station to machining station on the conveyor 22 of the transfer line 13. The workpieces 21 can be machined in each case from the side by the boring heads 11 of the machine tools 1 and 2 positioned on both sides. The machine tools indicated consist basically of a slide 19, on which the boring head carrier 23 is movable in the direction of the arrow 24. The boring head 23 carries the interchangeable boring head 11, whose boring tools operate on the workpiece 21 in the fed position.

In the drawing is indicated in each case the retracted position of the boring head carrier, in which the changing of the boring head 11 and the replacement by the boring head 14 is effected.

Tracks 3 and 4 are provided for this purpose, which are carried by the supports 25. Carriages 16 are movable on the tracks 3 and 4, carrying the changing device 5 or 6, such that these can be transported as required over one of the machine tools 1 or 2. The mechanisms for adequate positioning of the changing devices are not illustrated in detail.

The changing devices consist basically of a lifting mechanism 9 and the turning mechanism 10 carried by the lifting mechanism. The turning mechanism basically comprises the carrier 17, which is pivotal about the vertical axis 12. Therefore, as the illustration in FIG. 1 depicts, the arrangement is such that the turning device together with its basic components is situated outside the track 3 or 4.

The arm-like carrier 17 of the turning device has gripping mechanisms on its ends, which, for example, can be designed like a hammer head and which operate in conjunction with suitable components on the boring heads 11 or 14.

Figure 2:
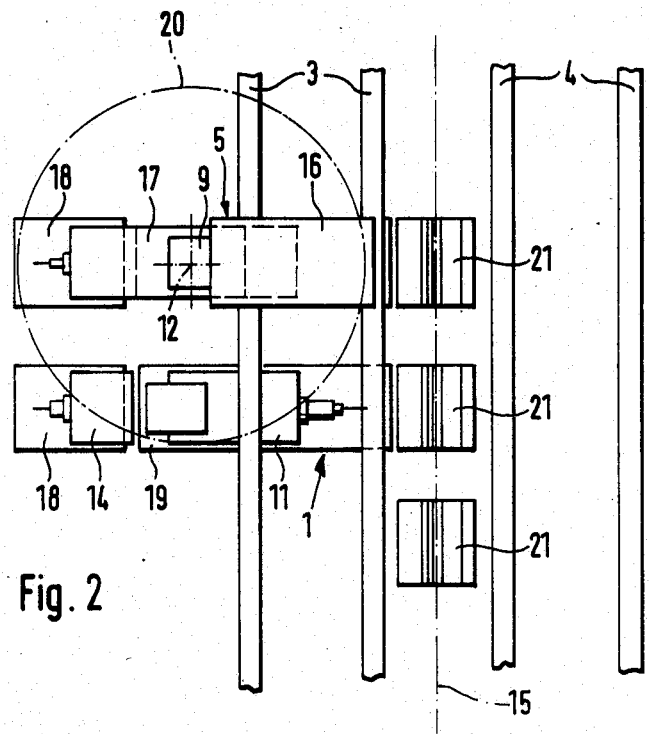
FIG. 2, a part plan view of the arrangement of FIG. 1.

For interchanging a boring head the turning mechanism 10 is lowered down sufficiently by means of the lifting mechanism 9 from the position indicated in FIG. 1, so that the gripping mechanisms 7 and 8 can operate in junction with the boring heads 14 respectively 11. The gripping mechanisms grip the boring heads, whereupon the appropriate connecting elements between the boring head 11, situated in the machining position and the boring head carrier are disconnected simultaneously. The boring heads 11 and 14 are now lifted so that they reach the position shown in chain dotted lines, in which the carrier 17 is pivoted about the axis 12 by preferably 180 deg. Therefore, the boring heads are situated at a height over the boring head carrier and all other components of the transfer line, such that sufficient space is available for the turning operation. The necessary turning circle 20 (see FIG. 2) thus sweeps the space over the neighbouring machine tool without interference.

The turning operation is effected avantageously through 180 deg., though this is by no means critical for the invention. In particular cases, pivoting can be effected through any suitable angle.

After carrying out the pivoting motion the lifting mechanism lowers the two boring heads down again. The new boring head is fixed to the boring head carrier, whilst the exchanged boring head is deposited at the depositing point 18. After the gripping mechanisms have separated from the boring heads and been lifted again, the new boring head can continue with the machining of the workpieces 21.

The boring head deposited at the depositing point 18 can be returned to the magazine and a new boring head can be placed at its position for a further exchange operation. The changing device 5 respectively 6 can be used for other exchange operations on other machine tools.

We claim:

1. Apparatus for use in the replacement exchange of drill heads or other tool heads in machine tools arranged along a workpiece transfer line, comprising a tool changing device, a track arrangement for said changing device and running parallel to said line, said device being capable of being associated with several of said machine tools and arranged above them, said changing device consisting of at least one gripping mechanism, at least one lifting mechanism and at least one turning mechanism, so that the gripping mechanism grips the tool head the lifting mechanism lifts the head to a level above that of the upper edge of the machine tool and the turning mechanism turns the head about a vertical axis in order to carry the tool head to a waiting position in a region of the machine tool remote from the transfer line and to position the head there.

2. Apparatus according to claim 1, wherein the changing device consists of two gripping mechanisms which are arranged at opposite sides of said vertical axis of the turning mechanism, in order to convey a second tool head into an operating region of the machine tool during the turning step 3. Apparatus according to claim 1, wherein said track arrangement is positioned to the side of the central plane of the transfer line and said vertical axis is arranged externally of the track.

4. Apparatus according to claim 1, wherein two track arrangements and two changing devices are provided, one of each side of the central plane of the transfer line.

5. Apparatus according to claim 1, wherein the changing device comprises a travelling carriage upon the track arrangement, to the side of which is attached said lifting mechanism, said turning mechanism being arranged around said vertical axis and wherein the turning mechanism includes a lower portion, said lower portion comprising a carrier secured at an intermediate region thereof, and having two end portions each of said end portion supporting one of said gripping mechanisms.

* * * * *